(12) United States Patent
Islam

(10) Patent No.: US 12,294,590 B2
(45) Date of Patent: May 6, 2025

(54) TECHNIQUES FOR MALICIOUS ENTITY DISCOVERY

(71) Applicant: Okta, Inc., San Francisco, CA (US)

(72) Inventor: Tanvir Islam, Lake Stevens, WA (US)

( * ) Notice: Subject to any disclaimer, the term of this patent is extended or adjusted under 35 U.S.C. 154(b) by 299 days.

(21) Appl. No.: 17/809,366

(22) Filed: Jun. 28, 2022

(65) Prior Publication Data

US 2023/0421577 A1    Dec. 28, 2023

(51) Int. Cl.
*H04L 29/06* (2006.01)
*H04L 9/40* (2022.01)

(52) U.S. Cl.
CPC .......... *H04L 63/1416* (2013.01); *H04L 63/08* (2013.01); *H04L 63/102* (2013.01)

(58) Field of Classification Search
CPC ... H04L 63/1416; H04L 63/08; H04L 63/102; H04L 63/1425; H04L 63/1433; H04L 63/1458; H04L 63/1466; G06N 20/00
See application file for complete search history.

(56) References Cited

U.S. PATENT DOCUMENTS

| | | | |
|---|---|---|---|
| 2012/0158541 A1* | 6/2012 | Ganti | G06Q 30/0185 705/26.35 |
| 2015/0215334 A1* | 7/2015 | Bingham | H04L 63/1425 726/23 |
| 2016/0226904 A1* | 8/2016 | Bartos | G06F 16/285 |
| 2017/0251005 A1* | 8/2017 | Niv | H04L 63/145 |
| 2018/0183821 A1* | 6/2018 | Schneider | G06F 16/285 |
| 2018/0332064 A1* | 11/2018 | Harris | H04L 43/08 |
| 2019/0238569 A1* | 8/2019 | Nandy | H04L 63/0227 |

* cited by examiner

*Primary Examiner* — Yogesh Paliwal
(74) *Attorney, Agent, or Firm* — Holland & Hart LLP

(57) ABSTRACT

Methods, systems, and devices for access management are described. A software platform may identify devices of a botnet based on a cluster score associated with a device characteristic. For example, the software platform may receive a request from a device to access an application. The software platform may determine a cluster score for the characteristic of the device. The cluster score may be based on a link between the device and a list of devices (e.g., devices of a botnet). If the cluster score satisfies (e.g., exceeds) a cluster score threshold, the software platform may deny the access request. In some examples, the cluster score may be determined using machine learning techniques. Based on determining the cluster score, the software platform may efficiently identify devices of the botnet and prevent brute force attacks, which may improve reliability of access for users of the application.

20 Claims, 8 Drawing Sheets

TECHNIQUES FOR MALICIOUS ENTITY DISCOVERY

FIELD OF TECHNOLOGY

The present disclosure relates generally to access management, and more specifically to techniques for malicious entity discovery.

BACKGROUND

A software platform may request a user to log into an application using authentication information, such as a combination of a username and a password. In some cases, a malicious entity may use brute force attacks to impact login procedures or otherwise reduce reliability of the application. Brute force attacks may impose a considerable burden on an infrastructure of the software platform, and conventional brute force attack mitigation techniques may be deficient or sub-optimal in some current configurations.

DETAILED DESCRIPTION

A software platform may request a user to log into an application (e.g., a software application or an Internet site) using authentication information, such as a combination of a username and a password. In some cases, a malicious entity may use brute force attacks to impact login procedures or otherwise reduce reliability of the software platform. A brute force attack may include one or more devices attempting (e.g., concurrently or sequentially) to access the application by logging in, providing combinations of usernames and passwords (e.g., a same username, with different passwords). In some cases, the one or more devices may be referred to as a network of bots or a "botnet." Brute force attacks may impose a considerable burden on an infrastructure supporting the software platform if the sources of the attack are not identified and blocked from attempting access. Further, while dealing with attack sources, it may be difficult to ensure users can continue to access the application. It may be beneficial to leverage relationships between devices of the botnet to discover the malicious entity.

The techniques described herein may enable a software platform to identify devices of a botnet based on a cluster score associated with a device characteristic. For example, the software platform may receive an access request from a device. The software platform may assign a device token to the device, where the device token may be an identifier (e.g., a cookie or another stable identifier) associated with the device. The software platform may determine a cluster score for a characteristic (e.g., an Internet Protocol (IP) address or a username used in the request) of the device. The cluster score may be based on a link between the device (as identified by the device token) and a list of devices (e.g., devices of a botnet, each of which may be assigned a respective device token). If the cluster score satisfies (e.g., exceeds) a cluster score threshold, the software platform may deny the access request. In some examples, the cluster score may be determined using machine learning techniques. Based on determining the cluster score, the software platform may efficiently identify devices of the botnet and prevent brute force attacks, which may improve reliability of access for users of the application.

Aspects of the disclosure are initially described in the context of a distributed computing environment and a system for access management. Aspects of the disclosure are further illustrated by and described with reference to a machine learning process, apparatus diagrams, system diagrams, and flowcharts that relate to techniques for malicious entity discovery.

Figure 1:
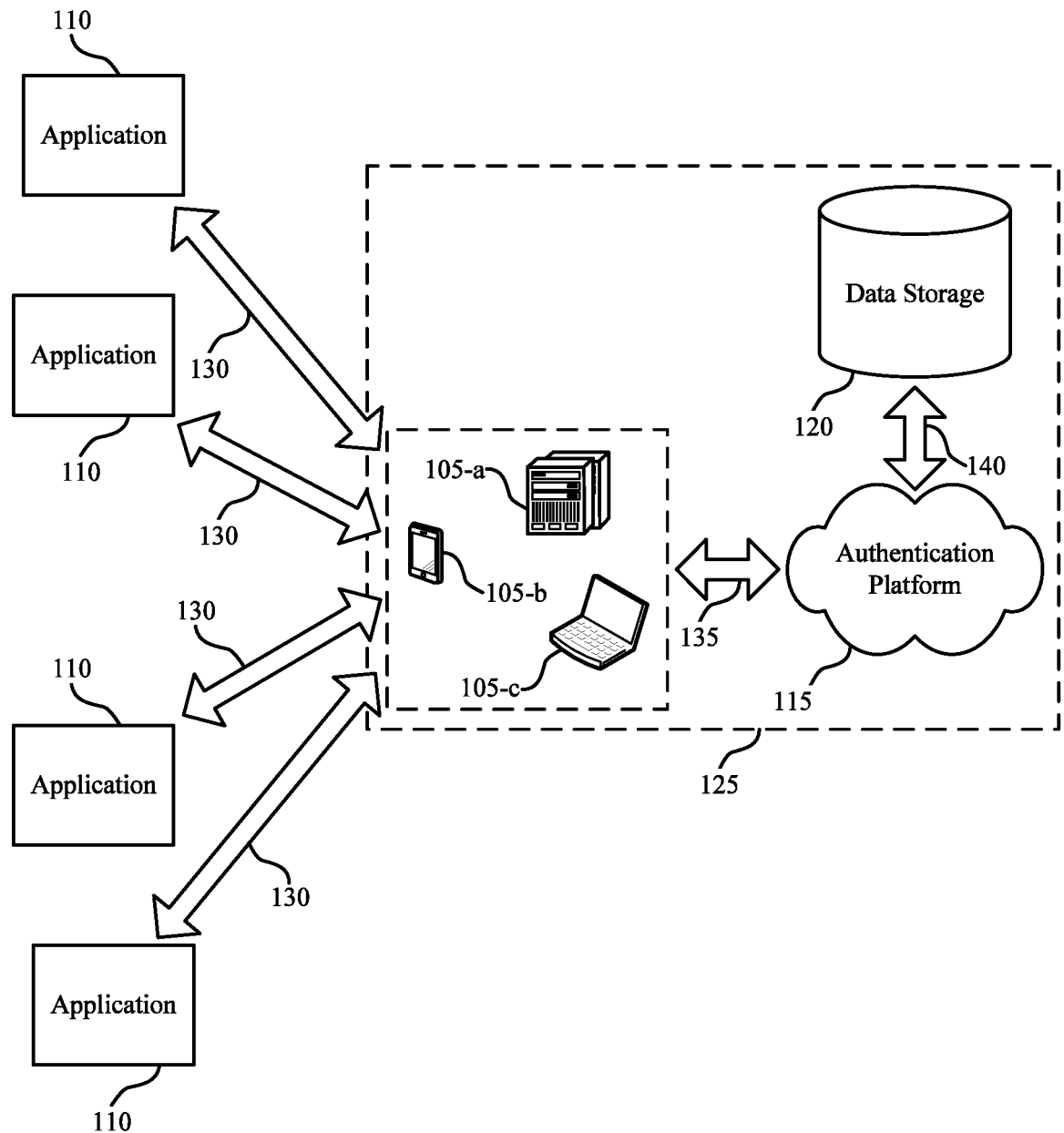
FIG. 1 illustrates an example of a system that supports techniques for malicious entity discovery in accordance with aspects of the present disclosure.

FIG. 1 illustrates an example of a system 100 for cloud computing that supports techniques for credential and identity synchronization in accordance with various aspects of the present disclosure. The system 100 includes client devices 105, applications 110, authentication platform 115, and data storage 120. Authentication platform 115 may be an example of a public or private cloud network. A client device 105 may access authentication platform 115 over network connection 135. The network may implement transfer control protocol and internet protocol (TCP/IP), such as the Internet, or may implement other network protocols. A client device 105 may be an example of a user device, such as a server (e.g., client device 105-a), a smartphone (e.g., client device 105-b), or a laptop (e.g., client device 105-c). In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other organization type.

A client device 105 may interact with multiple applications 110. The interactions 130 may include digital communications, application programming interface (API) calls, hypertext transfer protocol (HTTP) messages, or any other interaction between a client device 105 and an application 110. Data may be associated with the interactions 130. A client device 105 may access authentication platform 115 to store, manage, and process the data associated with the interactions 130. In some cases, the client device 105 may have an associated security or permission level. A client device 105 may have access to some applications, data, and database information within authentication platform 115 based on the associated security or permission level, and may not have access to others.

Applications 110 may interact with the client device 105 via email, web, text messages, or any other appropriate form of interaction. The interaction 130 may be a business-tobusiness (B2B) interaction or a business-to-consumer (B2C) interaction. An application 110 may also be referred to as a customer, a client, a website, or some other suitable terminology. In some cases, the application 110 may be an example of a server, a node, a compute cluster, or any other type of computing system, component, or environment. In some cases, the application 110 may be operated by a user or group of users.

Authentication platform 115 may offer cloud-based services to the client devices 105, the applications 110, or both. In some cases, authentication platform 115 may support database system such as a multi-tenant database system. In this case, authentication platform 115 may serve multiple client devices 105 with a single instance of software. However, other types of systems may be implemented, including—but not limited to—client-server systems, mobile device systems, and mobile network systems. Authentication platform 115 may receive data associated with interactions 130 from the client device 105 over network connection 135, and may store and analyze the data. In some cases, authentication platform 115 may receive data directly from an interaction 130 between an application 110 and the client device 105. In some cases, the client device 105 may develop applications to run on authentication platform 115. Authentication platform 115 may be implemented using remote servers. In some cases, the remote servers may be examples of data storage 120.

Data storage 120 may include multiple servers. The multiple servers may be used for data storage, management, and processing. Data storage 120 may receive data from authentication platform 115 via connection 140, or directly from the client device 105 or an interaction 130 between an application 110 and the client device 105. Data storage 120 may utilize multiple redundancies for security purposes. In some cases, the data stored at data storage 120 may be backed up by copies of the data at multiple locations.

Subsystem 125 may include client devices 105, authentication platform 115, and data storage 120. In some cases, data processing may occur at any of the components of subsystem 125, or at a combination of these components. In some cases, servers may perform the data processing. The servers may be a client device 105 or located at data storage 120.

As described herein, a subsystem 125 (e.g., a software platform associated with a client device 105 or an authentication platform 115) may be configured to identify devices of a botnet based on a cluster score associated with a device characteristic. For example, the subsystem 125 may receive a request from a device to access an application 110. The subsystem 125 may assign a device token to the device. In some examples, the device token may be an identifier, such as a cookie or another stable identifier, associated with the device. If a malicious entity controlling the device clears a cookie to avoid detection, the subsystem 125 may identify this (e.g., based on a quantity of cookies assigned to an IP address) and limit providing new cookies to the device. In some examples, the stable identifier may be an identifier that does not change between requests, such as a Medium Access Control (MAC) address or an International Mobile Equipment Identity (IMEI) number associated with the device.

The subsystem 125 may determine a cluster score for a characteristic (e.g., an IP address or a username used in the request) of the device. The cluster score may be based on a link between the device (as identified by the device token) and a list of devices (e.g., devices of a botnet, each of which may be assigned a respective device token). If the cluster score satisfies (e.g., exceeds) a cluster score threshold, the subsystem 125 may deny the access request. In some examples, the cluster score may be determined using machine learning techniques. Based on determining the cluster score, the subsystem 125 may efficiently identify devices or IP addresses of the botnet and prevent brute force attacks, which may improve reliability of access for users of the application 110.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
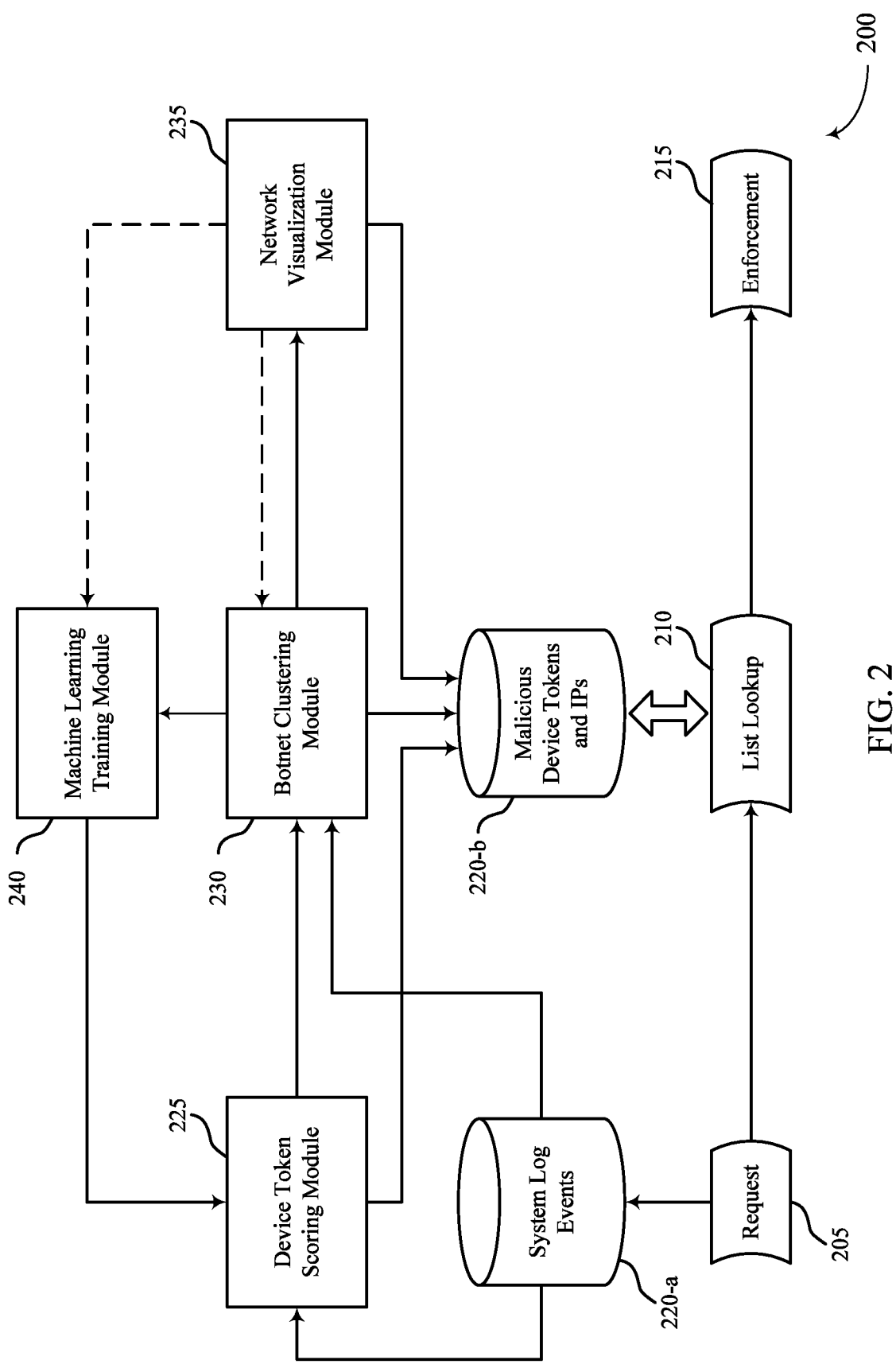
FIG. 2 illustrates an example of a system that supports techniques for malicious entity discovery in accordance with aspects of the present disclosure.

FIG. 2 illustrates an example of a system 200 that supports techniques for malicious entity discovery in accordance with aspects of the present disclosure. In some examples, the system 200 may include or implement aspects of the system 100. For example, the system 200 may be an example of a software platform, which may be an example of one or more components of a subsystem 125 described with reference to FIG. 1. The system 200 may include one or more databases 220, a device token scoring module 225, a botnet clustering module 230, a network visualization module 235, and a machine learning training module 240.

As described herein, the system 200 may be configured to identify devices of a botnet based on a cluster score associated with a device characteristic. For example, the system 200 may receive a request 205 from a device to access an application. The system 200 may assign a device token to the device, and store information associated with the request in a database 220-a, which may be configured to store system log events. In some examples, the device token may be an identifier, such as a cookie or another stable identifier, associated with the device. If the device clears a cookie to avoid botnet detection, the system 200 may identify this (e.g., based on a quantity of cookies assigned to an IP address, as stored in the database 220-a) and limit providing new cookies to the device. In some examples, the stable identifier may be an identifier that does not change between requests, such as a MAC address or an IMEI number associated with the device.

The system 200 may perform a list lookup 210 to identify whether the request 205 is received from a device that is associated with a malicious entity. For example, the system 200 may store a list of malicious device tokens or IP addresses in a database 220-b, and the system 200 may access the database 220-b as part of the list lookup 210. Based on an outcome of the list lookup 210, the system 200 may perform an enforcement action 215, which may include issuing a denial to the device in response to the request 205. Based on the actions performed at the system 200, the system 200 may efficiently identify devices of the botnet and prevent brute force attacks, which may improve reliability of access for users of the application.

The device token scoring module 225 may be a proactive supporting module for botnet discovery and response. The device token scoring module 225 may be configured to detect and prevent a malicious request 205 in real time. For example, the device token scoring module may receive information associated with the request 205 from the system log events stored in the database 220-a to identify whether the device token associated with the request 205 is associated with a malicious entity. In some examples, the device token scoring module 225 may identify whether the device token is associated with a malicious entity using a machine learning model artifact that is trained using malicious device tokens identified by the botnet clustering module 230. In some examples, the machine learning training module 240 may support the operations of the device token scoring module 225.

Based on the machine learning model artifact, the device token scoring module 225 may determine a threat score for the device token. If the threat score for the device token exceeds a threshold (e.g., 0.8, which may indicate an 80% likelihood the device token is associated with a malicious entity), the device token scoring module 225 may store the device token in the database 220-b. Thus, when the system 200 performs the list lookup 210, the system 200 may identify the device token in the database 220-b and perform the enforcement action 215 accordingly to deny the request 205. In some cases, however, the device token scoring module 225 may not be configured to detect a network of malicious device tokens and their interactions with entities (e.g., IP addresses) involved in a botnet. Accordingly, the botnet clustering module 230 may be used to detect additional device tokens associated with sophisticated attack patterns from a botnet.

The botnet clustering module 230 may be a reactive module for botnet discovery and response. The botnet clustering module 230 may detect and leverage device token linkages and their interactions with other entities (e.g., IP addresses) to detect botnets. It may be beneficial to use device tokens to detect botnets, as the device tokens may not be shared among users. That is, the device token may be unique to each device and so, unlike IP addresses, may not be employed as a proxy or a gateway for multiple users. Thus, during a botnet attack, in which consumer devices may be infected with malicious programs and controlled by an attack source, the botnet clustering module 230 may identify the botnet based on the linkages between device tokens.

The network visualization module 235 may provide a visualization of a network of device tokens and identified linkages, for example, to a security center dashboard associated with the system 200. Device tokens that are not connected to others may be identified as benign, while connected device tokens may be identified as part of a botnet. Additionally, or alternatively, the network visualization module 235 may provide a visualization of a network of IP addresses and identified linkages, where connected IP addresses may be identified as part of a botnet.

In some examples, an administrator operating the software platform may review the visualization and initiate additional actions based on the review. For example, the administrator may identify a false positive, where the botnet clustering module 230 may mistakenly determine that a set of device tokens belong to a botnet. The administrator may provide feedback to the system 200, which may be used to improve training of the machine learning training module 240 and the botnet clustering module 230, among other benefits. Additionally, or alternatively, the administrator may confirm an identified botnet, and proactively block further requests 205 from device tokens associated with the identified botnet.

Figure 3:
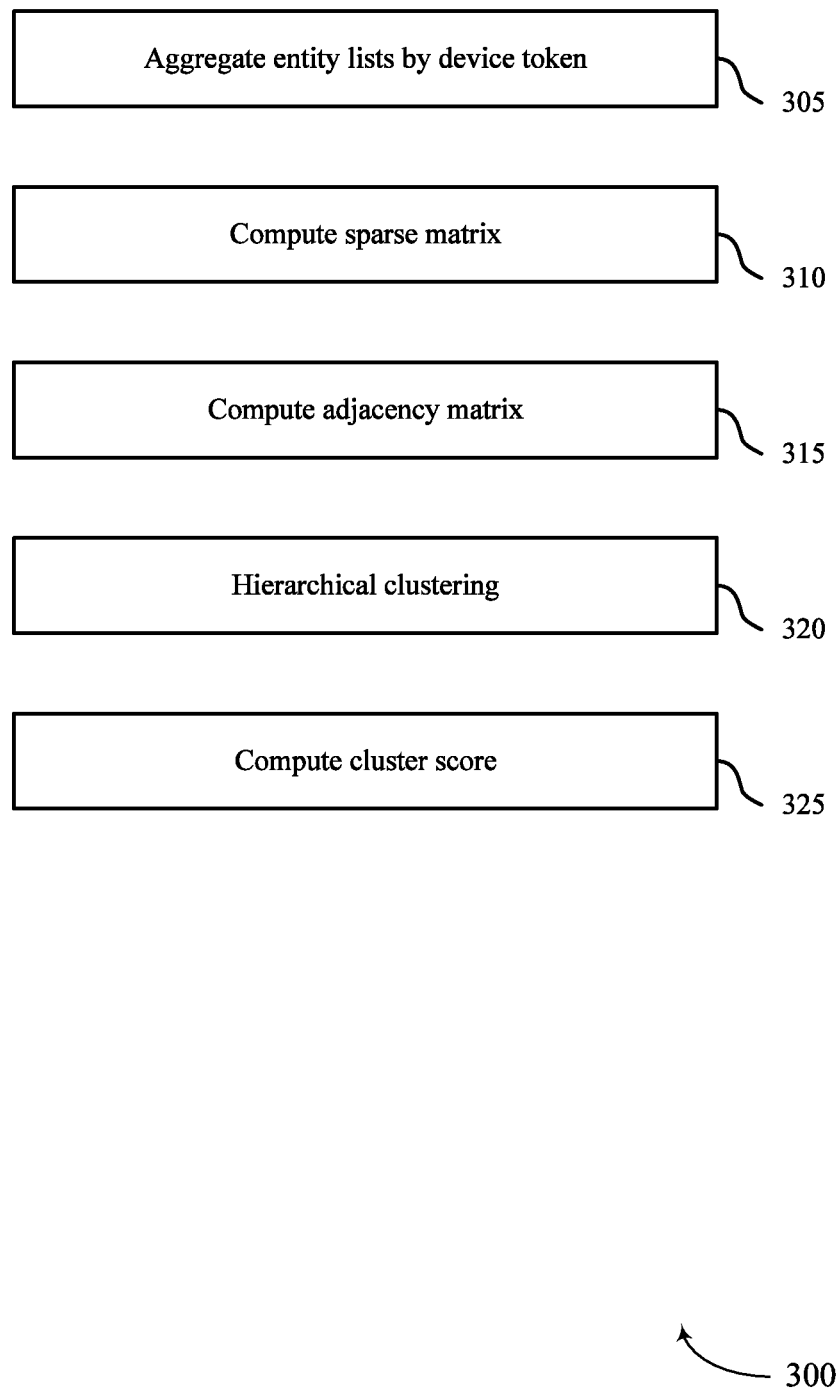
FIG. 3 illustrates an example of a scoring process that supports techniques for malicious entity discovery in accordance with aspects of the present disclosure.

FIG. 3 illustrates an example of a scoring process 300 that supports techniques for malicious entity discovery in accordance with aspects of the present disclosure. In some cases, the scoring process 300 may be implemented at botnet clustering module, such as a botnet clustering module 230 described with reference to FIG. 2.

At 305, the botnet clustering module may aggregate entity lists grouped by device tokens from a list of system log events. In some examples, the entities may include IP addresses and user identifiers (IDs).

In an example, the aggregation operation may be represented as code in Structured Query Language (SQL) as follows:

```
SELECT
    device_token,
    ARRAY_AGG(DISTINCT ip_address) AS ip_agg_list,
    ARRAY_AGG(DISTINCT user_id) AS user_id_agg_list
FROM
    syslog_events
GROUP BY
    device_token
```

The SQL code may produce a table of device tokens with associated IP address and user ID lists, as illustrated in Table 1:

TABLE 1

| device_token_id | ip_agg_list | user_id_agg_list |
|---|---|---|
| 001 | 1.1.1.1, 1.1.1.2 | aaa, bbb |
| 002 | 1.1.1.3 | ccc |
| 003 | 1.1.1.1, 1.1.1.3 | ddd |

It may be difficult to identify linkages between entities of Table 1 through manual observation. For example, while device tokens 001 and 002 do not include a common set, device tokens 001 and 003 share a common IP address, as do device tokens 002 and 003. Thus, device tokens 001 and 002 are also connected. Accordingly, interactions in a botnet may be discovered using a clustering algorithm with an adjacency matrix, as described herein.

At 310, the botnet clustering module may compute a sparse matrix from the table of device tokens (e.g., Table 1). The dimension of the sparse matrix may be (n_device_tokens, n_ips+n_users) and represent in binary form if there is a linkage between the device tokens and the IP addresses or user IDs.

At 315, the botnet clustering module may compute the adjacency matrix (e.g., based on the computed sparse matrix). For example, if the set of device tokens is represented as a graph G with a vertex set $V=\{v_1, v_2, \ldots, v_n\}$, then the adjacency matrix may be defined as:

$$A(i, j) = \begin{cases} 1, & \text{if } v_i \sim v_j \\ 0, & \text{otherwise,} \end{cases} \quad (1)$$

where $$A = \begin{bmatrix} a_{11} & a_{12} & \cdots & a_{1n} \\ a_{21} & a_{22} & \cdots & a_{2n} \\ \vdots & \vdots & \ddots & \vdots \\ a_{n1} & a_{n2} & \cdots & a_{nn} \end{bmatrix}. \quad (2)$$

That is, the adjacency matrix A may be computed such that if there is a linkage detected between a device token and any IP address or user ID in the aggregated lists, then the corresponding entry may be set to 1. Otherwise, the entry may be set to 0.

At 320, the botnet clustering module may perform hierarchical clustering based on the computed adjacency matrix.

For example, the adjacency matrix may be input into an algorithm (e.g., the Girvan-Newman algorithm) to detect linkages between the device tokens.

At 325, the botnet clustering module may compute a cluster score (e.g., a cluster threat score) for the device tokens. In some examples, the cluster score may be the median of the respective threat scores associated with each device token (e.g., the threat score determined by the device token scoring module 225 described with reference to FIG. 2). If the cluster score satisfies (e.g., exceeds) a cluster score threshold, the botnet cluster module may store the entities (e.g., device tokens and IP addresses) in a database configured to store a list of malicious device tokens or IP addresses.

In some examples, a single device token may act alone, but rotate a set of IP addresses (e.g., hundreds of IP addresses) as part of a botnet. Accordingly, the scoring process 300 may be repeated, with the exception that the list of device tokens may be aggregated by IP address, to hinder circumvention attempts by malicious actors. Based on the actions performed in the scoring process 300, the software platform may efficiently identify devices or IP addresses of a botnet and prevent brute force attacks, which may improve reliability of access for users of the application.

Figure 4:
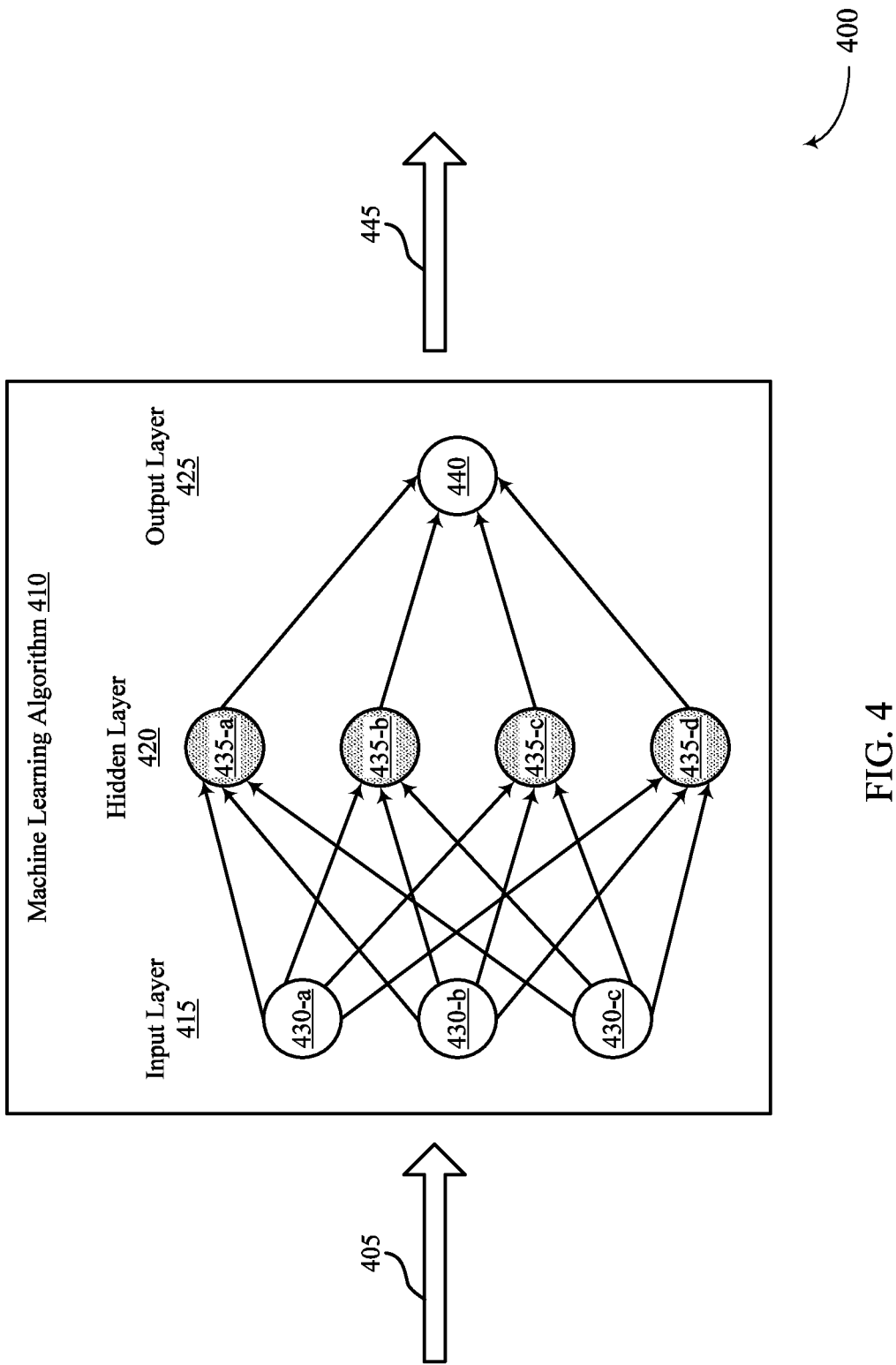
FIG. 4 illustrates an example of a machine learning process that supports techniques for malicious entity discovery in accordance with aspects of the present disclosure.

FIG. 4 illustrates an example of a machine learning process 400 that supports techniques for malicious entity discovery in accordance with aspects of the present disclosure. In some cases, the machine learning process 400 may be implemented at a machine learning module 240 described with reference to FIG. 2.

The machine learning process 400 may include a machine learning algorithm 410. As illustrated, the machine learning algorithm 410 may be an example of a neural network, such as a feed forward (FF) or deep feed forward (DFF) neural network, a recurrent neural network (RNN), a long/short term memory (LSTM) neural network, or any other type of neural network. However, any other machine learning algorithms may be supported. For example, the machine learning algorithm 410 may implement a nearest neighbor algorithm, a linear regression algorithm, a Naïve Bayes algorithm, a random forest algorithm, or any other machine learning algorithm. Furthermore, the machine learning process 400 may involve supervised learning.

The machine learning algorithm 410 may include an input layer 415, one or more hidden layers 420, and an output layer 425. In a fully connected neural network with one hidden layer 420, each hidden layer node 435 may receive a value from each input layer node 430 as input, where each input may be weighted. These neural network weights may be based on a cost function that is revised during training of the machine learning algorithm 410. Similarly, an output layer node 440 may receive a value from each hidden layer node 435 as input, where the inputs are weighted. If post-deployment training (e.g., online training) is supported, memory may be allocated to store errors and/or gradients for reverse matrix multiplication. These errors and/or gradients may support updating the machine learning algorithm 410 based on output feedback. Training the machine learning algorithm 410 may support computation of the weights (e.g., connecting the input layer nodes 430 to the hidden layer nodes 435 and the hidden layer nodes 435 to the output layer node 440) to map an input pattern to a desired output outcome. This training may result in a device-specific machine learning algorithm 410 based on the historic application data and data transfer for a specific device (e.g., a base station 105 or a UE 115).

In some examples, input values 405 may be sent to the machine learning algorithm 610 for processing. In some examples, preprocessing may be performed according to a sequence of operations on the input values 405 such that the input values 405 may be in a format that is compatible with the machine learning algorithm 410. The input values 405 may be converted into a set of k input layer nodes 630 at the input layer 415. In some cases, different measurements may be input at different input layer nodes 430 of the input layer 415. Some input layer nodes 430 may be assigned default values (e.g., values of 0) if the number of input layer nodes 430 exceeds the number of inputs corresponding to the input values 405. As illustrated, the input layer 615 may include three input layer nodes 430-a, 430-b, and 430-c. However, it is to be understood that the input layer 415 may include any number of input layer nodes 430 (e.g., 20 input nodes).

The machine learning algorithm 410 may convert the input layer 415 to a hidden layer 420 based on a number of input-to-hidden weights between the k input layer nodes 430 and the n hidden layer nodes 435. The machine learning algorithm 410 may include any number of hidden layers 420 as intermediate steps between the input layer 415 and the output layer 425. Additionally, each hidden layer 420 may include any number of hidden layer nodes 435. For example, as illustrated, the hidden layer 420 may include four hidden layer nodes 435-a, 435-b, 435-c, and 435-d. However, it is to be understood that the hidden layer 420 may include any number of hidden layer nodes 435 (e.g., 10 input nodes). In a fully connected neural network, each node in a layer may be based on each node in the previous layer. For example, the value of hidden layer node 435-a may be based on the values of input layer nodes 430-a, 430-b, and 430-c (e.g., with different weights applied to each node value).

The machine learning algorithm 410 may determine values for the output layer node 440 of the output layer 425 following one or more hidden layers 420. For example, the machine learning algorithm 410 may convert the hidden layer 420 to the output layer 425 based on a number of hidden-to-output weights between the n hidden layer nodes 435 and the output layer node 440. The output layer node 440 may correspond to an output value 445 of the machine learning algorithm 410. In some examples, post-processing may be performed on the output values 445 according to a sequence of operations such that the output values 445 may be in a format that is compatible with reporting the output values 445.

As described herein, the machine learning process 400 may be used to identify whether a device token associated with a request to access an application is associated with a malicious entity. For example, a target label value (e.g., a prediction of whether the device token is associated with a malicious entity) may be provided as an input value 405 to the machine learning algorithm 410. The machine leaning process 400 may be an example of a supervised learning method, where labels associated with the input value 405 may be discovered through a feedback loop (e.g., from the botnet clustering module). In some examples, a failure rate for the device token (e.g., computed as a quantity of unsuccessful login requests divided by a total quantity of login requests for the device token in the past 24 hours) may be used as an initial value for the threat score in a first iteration of the feedback loop.

In some examples, the machine learning algorithm 410 may use a tree-based classification model to develop a mapping function to predict if the device token is malicious. The prediction may be based on one or more features of the machine learning algorithm, such as the failure rate for the device token, an unknown user rate for the device token (e.g., computed as a quantity of unknown user login requests divided by the quantity of total login requests for the device token in the past 24 hours), one or more encoded values of a user agent associated with the login request, one or more encoded values of an HTTP header associated with the login request, feedback from a network visualization module, etc. Based on the prediction, the output value 445 may include a threat score for the device token, which may be used to determine whether to perform an enforcement action (e.g., issuing a denial in response to the request).

Figure 5:
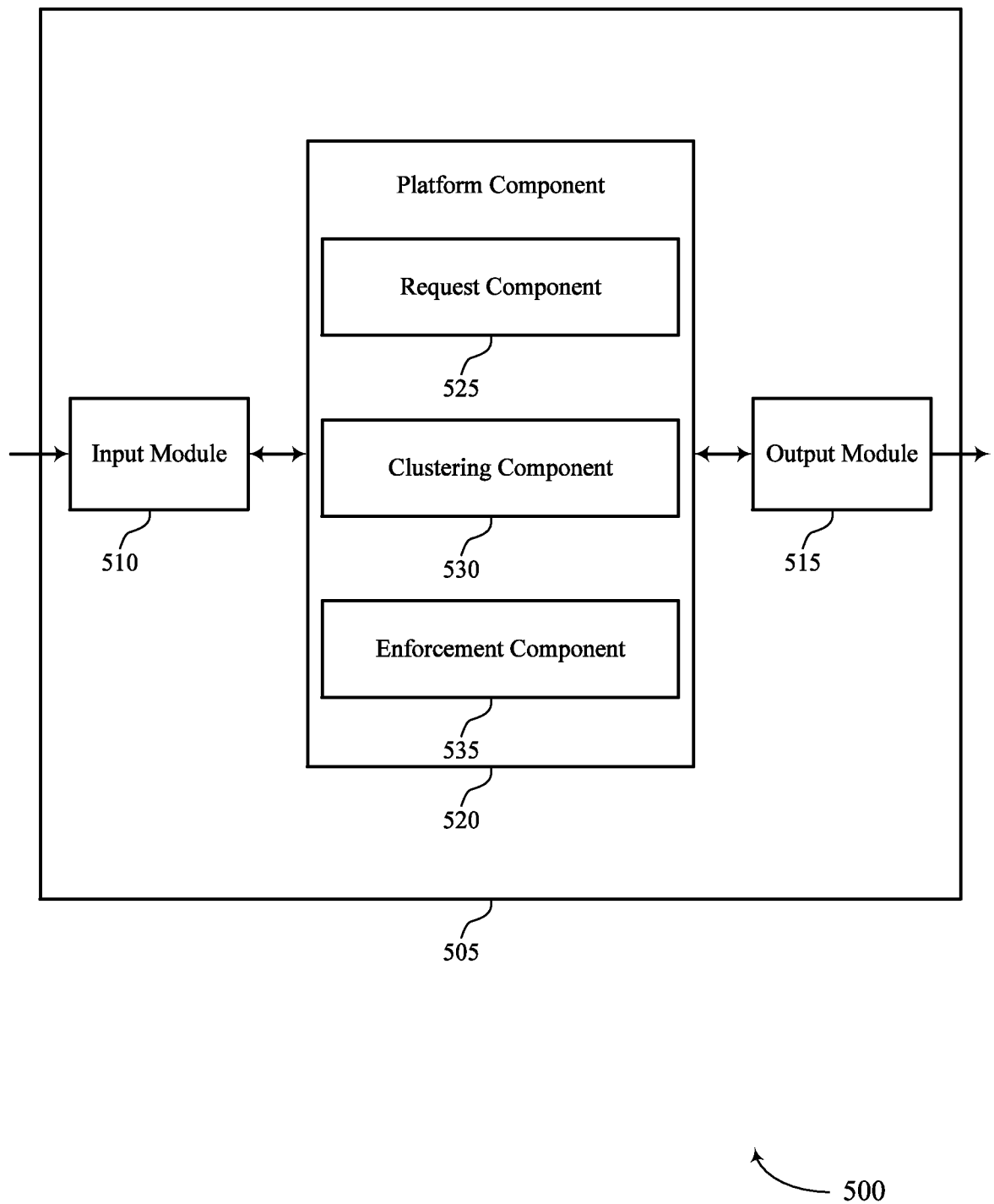
FIG. 5 shows a block diagram of an apparatus that supports techniques for malicious entity discovery in accordance with aspects of the present disclosure.

FIG. 5 shows a block diagram 500 of a device 505 that supports techniques for malicious entity discovery in accordance with aspects of the present disclosure. The device 505 may include an input module 510, an output module 515, and a platform component 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the platform component 520 to support techniques for malicious entity discovery. In some cases, the input module 510 may be a component of an I/O controller 710 as described with reference to FIG. 7.

The output module 515 may manage output signals for the device 505. For example, the output module 515 may receive signals from other components of the device 505, such as the platform component 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the platform component 520 may include a request component 525, a clustering component 530, an enforcement component 535, or any combination thereof. In some examples, the platform component 520, or various components thereof, may be configured to perform various operations (e.g., receiving, monitoring, transmitting) using or otherwise in cooperation with the input module 510, the output module 515, or both. For example, the platform component 520 may receive information from the input module 510, send information to the output module 515, or be integrated in combination with the input module 510, the output module 515, or both to receive information, transmit information, or perform various other operations as described herein.

The platform component 520 may support access management in accordance with examples as disclosed herein. The request component 525 may be configured as or otherwise support a means for receiving, from a device, a request to access an application. The clustering component 530 may be configured as or otherwise support a means for determining a cluster score for a characteristic of the device based on a link between the device and a list of devices. The enforcement component 535 may be configured as or otherwise support a means for issuing a denial in response to the request based on the cluster score satisfying a cluster score threshold.

Figure 6:
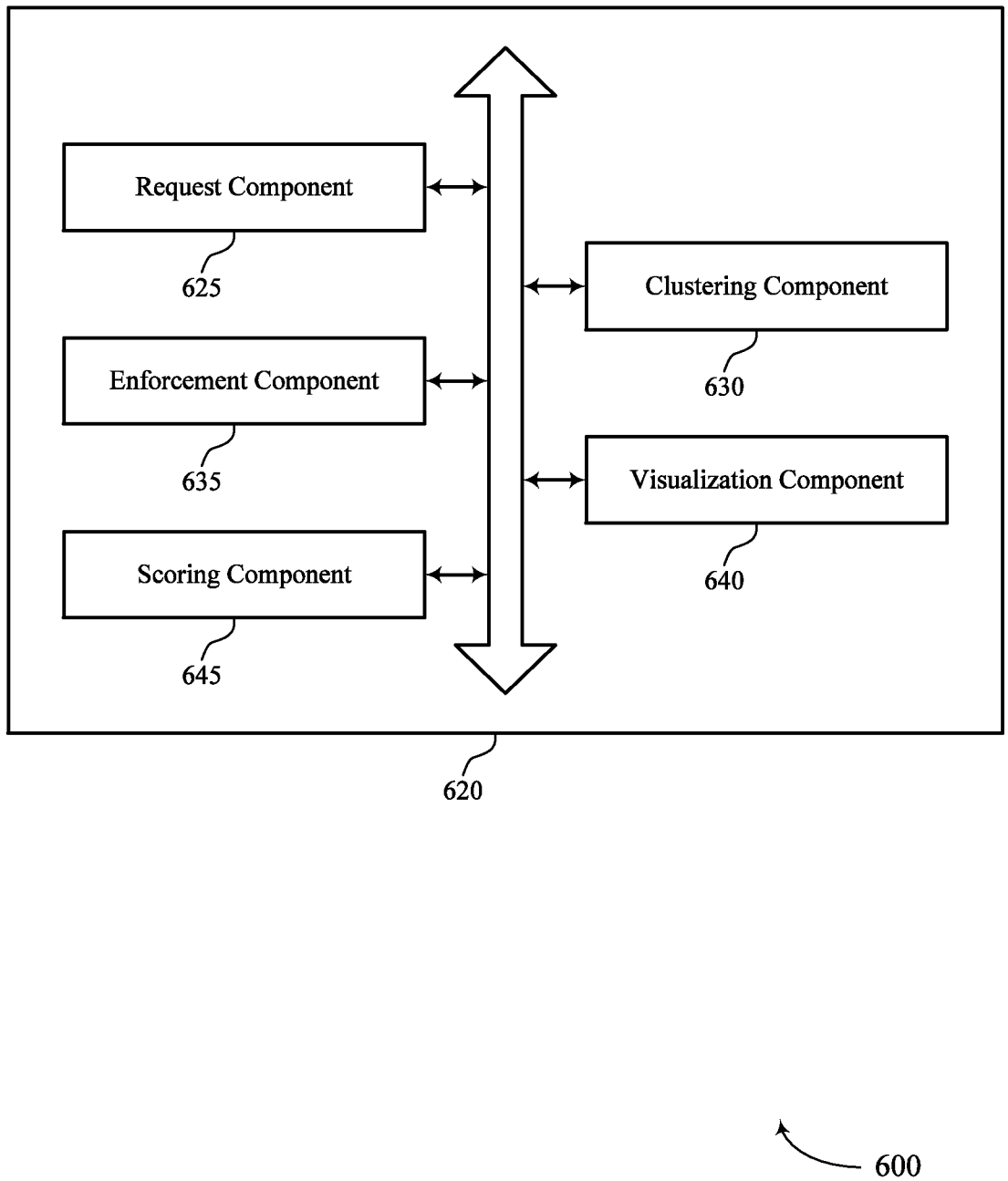
FIG. 6 shows a block diagram of a platform component that supports techniques for malicious entity discovery in accordance with aspects of the present disclosure.

FIG. 6 shows a block diagram 600 of a platform component 620 that supports techniques for malicious entity discovery in accordance with aspects of the present disclosure. The platform component 620 may be an example of aspects of a platform component or a platform component 520, or both, as described herein. The platform component 620, or various components thereof, may be an example of means for performing various aspects of techniques for malicious entity discovery as described herein. For example, the platform component 620 may include a request component 625, a clustering component 630, an enforcement component 635, a visualization component 640, a scoring component 645, or any combination thereof. Each of these components may communicate, directly or indirectly, with one another (e.g., via one or more buses).

The platform component 620 may support access management in accordance with examples as disclosed herein. The request component 625 may be configured as or otherwise support a means for receiving, from a device, a request to access an application. The clustering component 630 may be configured as or otherwise support a means for determining a cluster score for a characteristic of the device based on a link between the device and a list of devices. The enforcement component 635 may be configured as or otherwise support a means for issuing a denial in response to the request based on the cluster score satisfying a cluster score threshold.

In some examples, to support determining the cluster score, the clustering component 630 may be configured as or otherwise support a means for generating a table of characteristics based on a set of system log events, where the characteristics in the table are grouped according to device token identifiers associated with the list of devices. In some examples, to support determining the cluster score, the clustering component 630 may be configured as or otherwise support a means for computing a first matrix based on the device token identifiers and the characteristics. In some examples, to support determining the cluster score, the clustering component 630 may be configured as or otherwise support a means for computing a second matrix based on the first matrix to detect links between the device token identifiers and the characteristics. In some examples, to support determining the cluster score, the clustering component 630 may be configured as or otherwise support a means for identifying a cluster based on the detected links. In some examples, to support determining the cluster score, the clustering component 630 may be configured as or otherwise support a means for calculating the cluster score based on computing the second matrix and identifying the cluster.

In some examples, to support calculating the cluster score, the clustering component 630 may be configured as or otherwise support a means for performing an algorithm to identify the cluster and to obtain the cluster score from the second matrix, where the second matrix is an input for the algorithm.

In some examples, the characteristics in the table include the characteristic of the device.

In some examples, the set of system log events include the received request.

In some examples, the first matrix includes a sparse matrix. In some examples, the second matrix includes an adjacency matrix.

In some examples, the visualization component 640 may be configured as or otherwise support a means for generating a visual representation of a set of system log events prior to receiving the request. In some examples, the visualization component 640 may be configured as or otherwise support a means for outputting the visual representation to a security application.

In some examples, the clustering component 630 may be configured as or otherwise support a means for receiving an input based on outputting the visual representation, where determining the cluster score is based on the received input.

In some examples, the scoring component 645 may be configured as or otherwise support a means for determining a threat score for the characteristic of the device based on a machine learning model, where the cluster score is determined based on the determined threat score.

In some examples, the characteristic of the device includes an IP address associated with the device, a user identification associated with the request, a token associated with the device, or any combination thereof.

Figure 7:
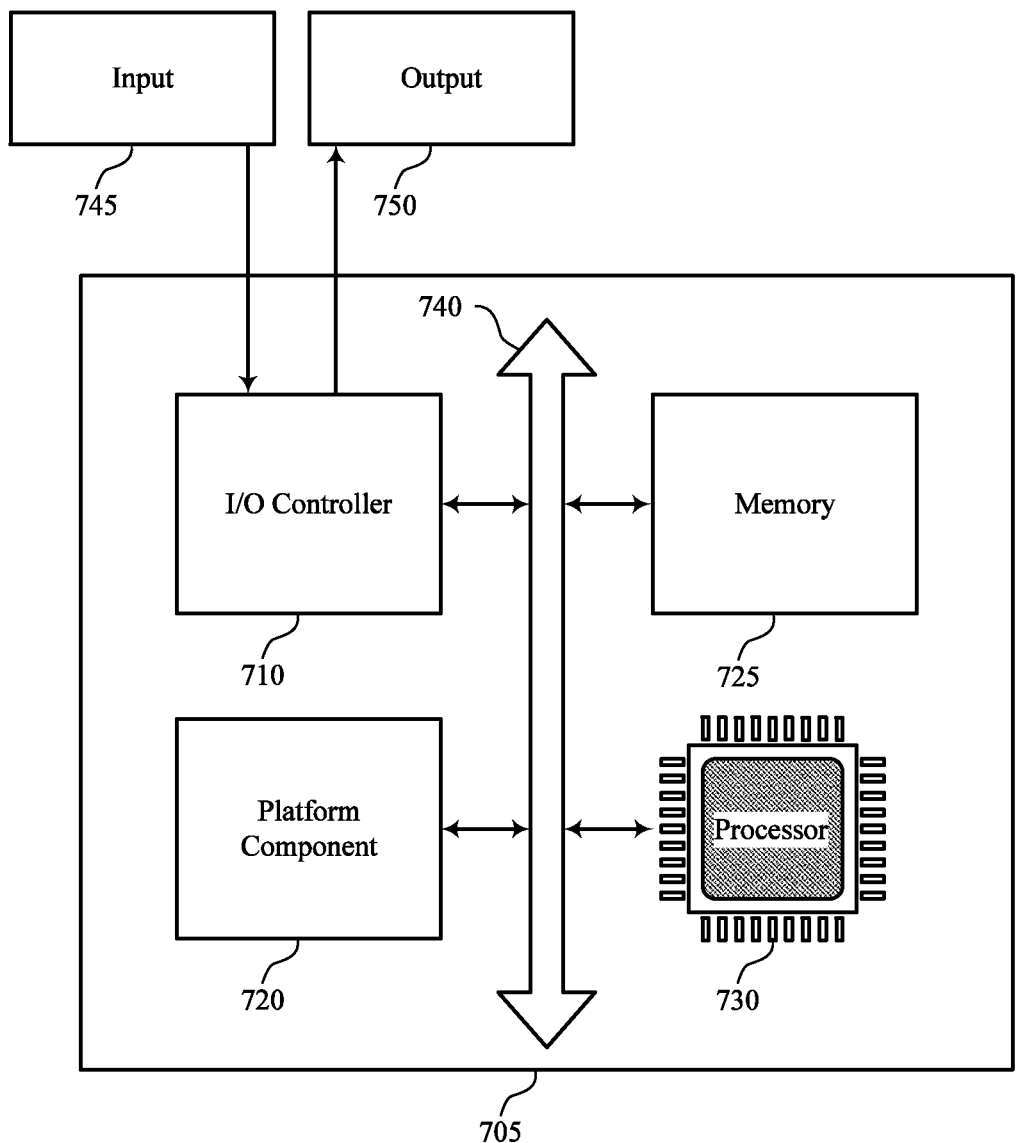
FIG. 7 shows a diagram of a system including a device that supports techniques for malicious entity discovery in accordance with aspects of the present disclosure.

FIG. 7 shows a diagram of a system 700 including a device 705 that supports techniques for malicious entity discovery in accordance with aspects of the present disclosure. The device 705 may be an example of or include the components of a device 505 as described herein. The device 705 may include components for bi-directional data communications including components for transmitting and receiving communications, such as a platform component 720, an input/output (I/O) controller 710, a memory 725, and a processor 730. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

Memory 725 may include random-access memory (RAM) and read-only memory (ROM). The memory 725 may store computer-readable, computer-executable software including instructions that, when executed, cause the processor 730 to perform various functions described herein. In some cases, the memory 725 may contain, among other things, a basic I/O system (BIOS) which may control basic hardware or software operation such as the interaction with peripheral components or devices.

The processor 730 may include an intelligent hardware device, such as a general-purpose processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for malicious entity discovery).

The platform component 720 may support access management in accordance with examples as disclosed herein. For example, the platform component 720 may be configured as or otherwise support a means for receiving, from a device, a request to access an application. The platform component 720 may be configured as or otherwise support a means for determining a cluster score for a characteristic of the device based on a link between the device and a list of devices. The platform component 720 may be configured as or otherwise support a means for issuing a denial in response to the request based on the cluster score satisfying a cluster score threshold.

By including or configuring the platform component 720 in accordance with examples as described herein, the device 705 may support techniques for improved user experience related to reduced processing, reduced power consumption, more efficient utilization of resources, and improved utilization of processing capability, among other benefits.

Figure 8:
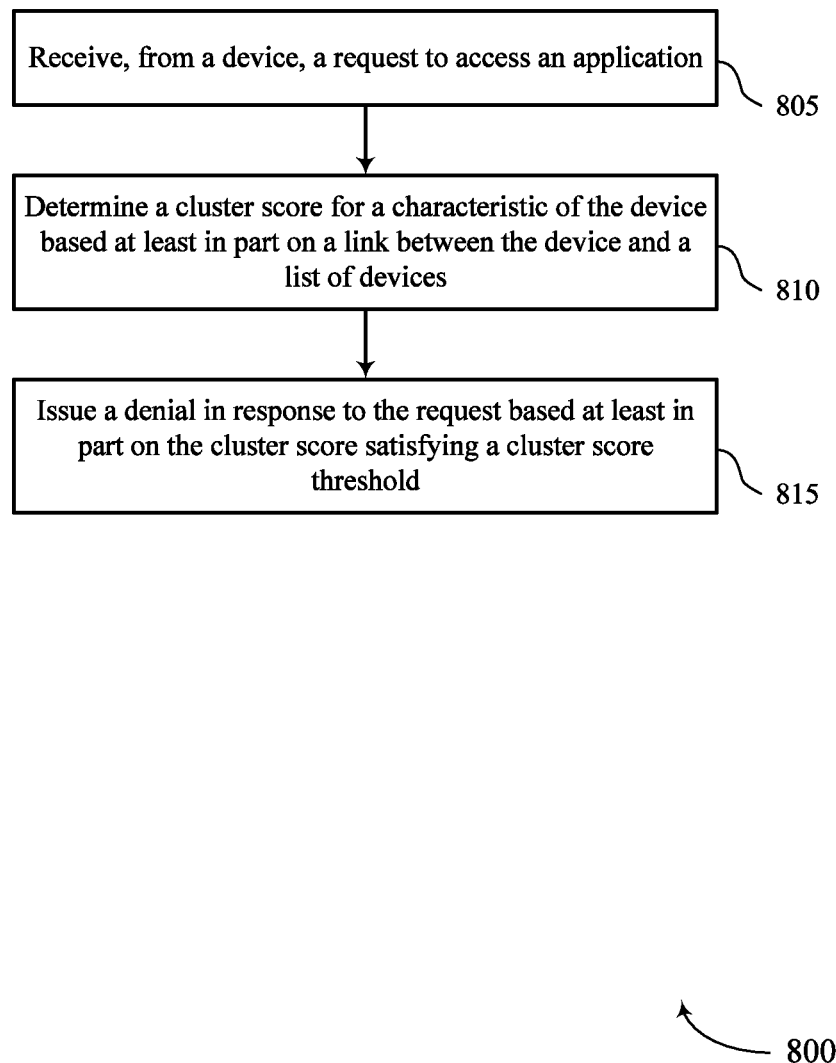
FIG. 8 shows a flowchart illustrating methods that support techniques for malicious entity discovery in accordance with aspects of the present disclosure.

FIG. 8 shows a flowchart illustrating a method 800 that supports techniques for malicious entity discovery in accordance with aspects of the present disclosure. The operations of the method 800 may be implemented by a device (or its components) that includes a software platform as described herein. For example, the operations of the method 800 may be performed by a client device as described with reference to FIGS. 1 through 7. In some examples, a client device may execute a set of instructions to control the functional elements of the client device to perform the described functions. Additionally, or alternatively, the client device may perform aspects of the described functions using special-purpose hardware.

At 805, the method may include receiving, from a device, a request to access an application. The operations of 805 may be performed in accordance with examples as disclosed herein. In some examples, aspects of the operations of 805 may be performed by a request component 625 as described with reference to FIG. 6.

At 810, the method may include determining a cluster score for a characteristic of the device based on a link between the device and a list of devices. The operations of 810 may be performed in accordance with examples as disclosed herein. In some examples, aspects of the operations of 810 may be performed by a clustering component 630 as described with reference to FIG. 6.

At 815, the method may include issuing a denial in response to the request based on the cluster score satisfying a cluster score threshold. The operations of 815 may be performed in accordance with examples as disclosed herein. In some examples, aspects of the operations of 815 may be performed by an enforcement component 635 as described with reference to FIG. 6.

A method for access management is described. The method may include receiving, from a device, a request to access an application, determining a cluster score for a characteristic of the device based on a link between the device and a list of devices, and issuing a denial in response to the request based on the cluster score satisfying a cluster score threshold.

An apparatus for access management is described. The apparatus may include a processor, memory coupled with the processor, and instructions stored in the memory. The instructions may be executable by the processor to cause the apparatus to receive, from a device, a request to access an application, determine a cluster score for a characteristic of the device based on a link between the device and a list of devices, and issue a denial in response to the request based on the cluster score satisfying a cluster score threshold.

Another apparatus for access management is described. The apparatus may include means for receiving, from a device, a request to access an application, means for determining a cluster score for a characteristic of the device based on a link between the device and a list of devices, and means for issuing a denial in response to the request based on the cluster score satisfying a cluster score threshold.

A non-transitory computer-readable medium storing code for access management is described. The code may include instructions executable by a processor to receive, from a device, a request to access an application, determine a cluster score for a characteristic of the device based on a link between the device and a list of devices, and issue a denial in response to the request based on the cluster score satisfying a cluster score threshold.

In some examples of the method, apparatuses, and non-transitory computer-readable medium described herein, determining the cluster score may include operations, features, means, or instructions for generating a table of characteristics based on a set of system log events, where the characteristics in the table may be grouped according to device token identifiers associated with the list of devices, computing a first matrix based on the device token identifiers and the characteristics, computing a second matrix based on the first matrix to detect links between the device token identifiers and the characteristics, identifying a cluster based on the detected links, and calculating the cluster score based on computing the second matrix and identifying the cluster.

In some examples of the method, apparatuses, and non-transitory computer-readable medium described herein, calculating the cluster score may include operations, features, means, or instructions for performing an algorithm to identify the cluster and to obtain the cluster score from the second matrix, where the second matrix may be an input for the algorithm.

In some examples of the method, apparatuses, and non-transitory computer-readable medium described herein, the characteristics in the table include the characteristic of the device.

In some examples of the method, apparatuses, and non-transitory computer-readable medium described herein, the set of system log events include the received request.

In some examples of the method, apparatuses, and non-transitory computer-readable medium described herein, the first matrix includes a sparse matrix and the second matrix includes an adjacency matrix.

Some examples of the method, apparatuses, and non-transitory computer-readable medium described herein may further include operations, features, means, or instructions for generating a visual representation of a set of system log events prior to receiving the request and outputting the visual representation to a security application.

Some examples of the method, apparatuses, and non-transitory computer-readable medium described herein may further include operations, features, means, or instructions for receiving an input based on outputting the visual representation, where determining the cluster score may be based on the received input.

Some examples of the method, apparatuses, and non-transitory computer-readable medium described herein may further include operations, features, means, or instructions for determining a threat score for the characteristic of the device based on a machine learning model, where the cluster score may be determined based on the determined threat score.

In some examples of the method, apparatuses, and non-transitory computer-readable medium described herein, the characteristic of the device includes an Internet Protocol (IP) address associated with the device, a user identification associated with the request, a token associated with the device, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for access management, comprising:
   receiving, from a device, a request to access an application;
   computing a first matrix based at least in part on device token identifiers and characteristics associated with a list of devices and a second matrix that is based at least in part on the first matrix to detect links between the device token identifiers and the characteristics;
   computing a cluster score for a characteristic of the device based at least in part on a link between the device and the list of devices and on computation of the second matrix; and
   issuing a denial in response to the request based at least in part on the cluster score satisfying a cluster score threshold.

2. The method of claim 1, wherein computing the cluster score comprises:
   generating a table of characteristics based at least in part on a set of system log events, wherein the characteristics in the table are grouped according to the device token identifiers associated with the list of devices;
   identifying a cluster based at least in part on the detected respective links detected via computation of the second matrix; and
   calculating the cluster score based at least in part on computing the second matrix and identifying the cluster.

3. The method of claim 2, wherein calculating the cluster score comprises:
   performing an algorithm to identify the cluster and to obtain the cluster score from the second matrix, wherein the second matrix is an input for the algorithm.

4. The method of claim 2, wherein the characteristics in the table comprise the characteristic of the device.

5. The method of claim 2, wherein the set of system log events comprises the request to access the application.

6. The method of claim 1, wherein:
   the first matrix comprises a sparse matrix; and
   the second matrix comprises an adjacency matrix.

7. The method of claim 1, further comprising:
   generating a visual representation of a set of system log events prior to receiving the request; and
   outputting the visual representation to a security application.

8. The method of claim 7, further comprising:
   receiving an input based at least in part on outputting the visual representation, wherein computing the cluster score is based at least in part on reception of the input.

9. The method of claim 1, further comprising:
   determining a threat score for the characteristic of the device based at least in part on a machine learning model, wherein the cluster score is computed based at least in part on determination of the threat score.

10. The method of claim 1, wherein the characteristic of the device comprises an Internet Protocol (IP) address associated with the device, a user identification associated with the request, a token associated with the device, or any combination thereof.

11. An apparatus for access management, comprising:
    a processor;
    memory coupled with the processor; and
    instructions stored in the memory and executable by the processor to cause the apparatus to:
      receive, from a device, a request to access an application;
      compute a first matrix based at least in part on device token identifiers and characteristics associated with a list of devices and a second matrix that is based at least in part on the first matrix to detect links between the device token identifiers and the characteristics;

compute a cluster score for a characteristic of the device based at least in part on a link between the device and the list of devices and on computation of the second matrix; and issue a denial in response to the request based at least in part on the cluster score satisfying a cluster score threshold.

12. The apparatus of claim 11, wherein the instructions to compute the cluster score are executable by the processor to cause the apparatus to:

generate a table of characteristics based at least in part on a set of system log events, wherein the characteristics in the table are grouped according to device token identifiers associated with the list of devices;

identify a cluster based at least in part on respective links detected via computation of the second matrix; and calculate the cluster score based at least in part on computing the second matrix and identifying the cluster.

13. The apparatus of claim 12, wherein the instructions to calculate the cluster score are executable by the processor to cause the apparatus to:

perform an algorithm to identify the cluster and to obtain the cluster score from the second matrix, wherein the second matrix is an input for the algorithm.

14. The apparatus of claim 12, wherein the characteristics in the table comprise the characteristic of the device.

15. The apparatus of claim 12, wherein the set of system log events comprises the request to access the application.

16. The apparatus of claim 11, wherein:
the first matrix comprises a sparse matrix; and
the second matrix comprises an adjacency matrix.

17. The apparatus of claim 11, wherein the instructions are further executable by the processor to cause the apparatus to:

generate a visual representation of a set of system log events prior to receiving the request; and output the visual representation to a security application.

18. The apparatus of claim 11, wherein the instructions are further executable by the processor to cause the apparatus to:

determine a threat score for the characteristic of the device based at least in part on a machine learning model, wherein the cluster score is computed based at least in part on determination of the threat score.

19. The apparatus of claim 11, wherein the characteristic of the device comprises an Internet Protocol (IP) address associated with the device, a user identification associated with the request, a token associated with the device, or any combination thereof.

20. A non-transitory computer-readable medium storing code for access management, the code comprising instructions executable by a processor to:

receive, from a device, a request to access an application;

compute a first matrix based at least in part on device token identifiers and characteristics associated with a list of devices and a second matrix that is based at least in part on the first matrix to detect links between the device token identifiers and the characteristics;

compute a cluster score for a characteristic of the device based at least in part on a link between the device and the list of devices and on computation of the second matrix; and issue a denial in response to the request based at least in part on the cluster score satisfying a cluster score threshold.

* * * * *